United States Patent [11] 3,543,698

| [72] | Inventor | Hans Grubelnik<br>Waldschulstrasse 44, Munich, Germany |
|---|---|---|
| [21] | Appl. No. | 761,362 |
| [22] | Filed | July 5, 1968<br>Continuation-in-part of Ser. No. 481,138, Aug. 19, 1965, which is a continuation-in-part of Ser. No. 639,914, May 19, 1967, both abandoned. |
| [45] | Patented | Dec. 1, 1970 |
| [32] | Priority | Sept. 14, 1964 |
| [33] | | Germany |
| [31] | | No. G41,508 |

[54] DEVICE FOR CONTROLLING AN INTERMITTENT WORK CYCLE
4 Claims, 7 Drawing Figs.

[52] U.S. Cl. ........................................... 107/68, 107/8
[51] Int. Cl. ........................................... A21c 7/06
[50] Field of Search ........................................... 107/8, 8.9, 68

[56] References Cited
UNITED STATES PATENTS

| 667,866 | 2/1901 | Calleson ................ | 72/417 |
| 2,192,916 | 3/1940 | Kaddeland et al. ....... | 271/53 |
| 2,606,664 | 8/1952 | Messick ................. | 108/21 |
| 3,058,366 | 10/1962 | Matthews ............... | 74/435 |

FOREIGN PATENTS

| 1,052,925 | 3/1959 | Germany ................ | 107/8(.9) |

*Primary Examiner*—Walter A. Scheel
*Assistant Examiner*—Robert I. Smith
*Attorney*—Fleit, Gipple & Jacobson ABSTRACT: This application concerns an indenting machine for successively working pieces of dough, consisting of a stationary frame carrying a conveyor belt for transporting pieces of dough. A knife head spindle rail extends over the conveyor and carries a knife for penetrating the dough. A drive arrangement is provided which will intermittently advance the belt and thereby bring successive pieces of dough into the work zone and, also, raise and lower the knife head spindle rail. An arrangement is provided for rotating the knife during upward and downward movement of the drive head spindle rail, which arrangement is selectively adjustable to a position which prevents rotation of the knife.

Inventor
Hans Grubelnik

Stevens, Davis, Miller & Mosher

Attorneys

INVENTOR
HANS GRUBELNIK

INVENTOR
HANS GRUBELNIK
BY *Stevens, Davis, Miller & Mosher*
ATTORNEYS

DEVICE FOR CONTROLLING AN INTERMITTENT WORK CYCLE

This application is a continuation in part of both U.S. Pat. application Ser. No. 481,138 filed Aug. 19, 1965, now abandoned, and U.S. Pat. application Ser. No. 639,914 filed May 19, 1967 now abandoned.

This invention relates to a device for controlling at least one intermittent work cycle by means of a continuously rotating drive shaft, used in bakery machines, especially notching machines. It is, however, not limited to this field of application, but can be used wherever at least one intermittent work cycle is to be initiated by a continuously rotating drive shaft.

Devices of the above-mentioned nature are well known. The problem can, for instance, be solved by means of electric brake motors. But for bakery machines this solution is much too cumbersome and therefore expensive. For this reason mechanical solutions by means of push rods or a curved piece with connecting rod and long slot have been proposed. But all known mechanical solutions have in common the disadvantage that the motions of the driven equipment cannot be blocked, at least not without additional means. There is always the danger that, for instance, on a notching machine which is used for making a variety of rolls, either the jack frame of the cutter head is dislodged downward by being unintentionally leaned on and/or that the conveyor belt for the cup holders is shifted sideways by hand. In such a case the work cycle of the machine gets out of step with possible damage ensuing. Under consideration of present-day practices it is the purpose of this invention to present a simple and inexpensive mechanical solution of the described problem by a self-blocking device.

The solution of the problem consists of a device for controlling at least one intermittent operating cycle by means of a continuously rotating drive shaft in which, according to this invention, an intermediate member is provided between the main drive shaft and the drive shaft for the intermittent operating cycle. The intermediate member consists of a gear segment and a blocking disk with a cutaway segment, the gear segment being engaged with a gear and the blocking disk being engaged with another blocking disk having also a cutaway segment, the last-named blocking disk being mounted on the drive shaft for the intermittent operating cycle.

The device presents a variety of advantages because by a suitable choice of the gear diameter and the number of teeth one can produce a motion of any desired extent for an intermittent operating cycle from the continuous rotation of the drive shaft. The invention is as such in no way limited in regard to its own size or that of the forces transmitted. In addition to that, it is well known that rotating motions have the advantage of lower resistances which must be overcome. The drive shaft can rotate either clockwise or counterclockwise. The invention is therefore applicable wherever intermittent motions for an operating cycle derived from a rotating drive shaft are to be controlled according to the requirements of the operating cycle.

In addition to the above-mentioned roll-molding machine in which, according to this invention, the up-and-down motion of the cutter head jack frame as well as the translatory motion of the conveyor belt for the cup holders can be initiated by one single drive shaft with almost perfect coordination of the work cycles, this invention can also be applied on an afterfermentation cabinet. In that case the invention can be used for the conversion of one revolution of the drive shaft into an upward motion of 2 inches by which the supporting chains have to raise the stacking trays so that the following tray can be placed automatically into the fermentation cabinet. The device can furthermore be used for magazine-filling equipment where stacking trays and putting-down conveyor belts are to be moved intermittently.

If a second intermittent working cycle is to be controlled by this device, all that is necessary, according to this invention, is to have the intermediate member engaged with another gear and another blocking disk with a cutaway segment. In this case the two intermittent working cycles are preferably arranged on opposite sides. Evidently, with a suitable size of the intermediate member and a suitable design of both the gear segment disk as well as the blocking disk, even more than two intermittent working cycles can be controlled by a single drive shaft.

In a further development of this invention the cutaway segments of the cooperating blocking disks are equipped with limit stops. These limit stops of the engaged blocking disks preclude the danger of overstressing the teeth of the gear segment disk and of the gears of the drive shaft for the intermittent operations.

A further embodiment of this invention appears highly advantageous by having the intermediate member mounted directly on the main drive shaft. This makes an especially simple arrangement of the intermediate member and, at the same time, a saving of space possible.

One conventional machine with which the invention can be used is related to an indenting machine for worked pieces of dough in which the knife-head spindles are not displaceable in longitudinal direction, but are supported for rotation in a knife-head spindle rail which moves up and down. Such a machine is disclosed in German Pat. No. 1,052,925. The pieces of dough are each held in a separate receiving cup during the indenting process. The indenting is effected in the manner that the receiving cup which contains a piece of dough is guided in each case below the knife head by a conveyor belt which is moved preferably intermittently by the machine so that the knife head penetrates the piece of dough with vertical guidance and possibly with simultaneous turning.

In such conventional indenting machines, it is known to arrange the knife head bearing the indentation knife on the lower end of a spindle which reciprocates in a hollow cylinder. It is furthermore known in this connection to provide the hollow cylinder with guide grooves whereby, with corresponding development of the spindles, a turning of the latter and thus of the knife head can take place.

With vertical guidance without rotation of the knife head, the pieces of dough are imparted with, for instance, the shape of star rolls, while with simultaneous rotation of the knife head, however, the pieces of dough assume a shape similar to Kaiser rolls.

If it is desired in the conventional indenting machines to change from the form of Kaiser rolls to the form of star rolls, it is necessary to remove not only the knife head, but also the upward and downward moving spindles, together with their support, and then install the spindles and their support required for the shape of star rolls.

This changeover is accomplished in a machine including the invention in the manner that upon transfer from the shape of Kaiser rolls to the shape of star rolls, it is merely necessary to replace the knife head alone without altering the guide means and to turn the newly inserted knife head and operating knob by 90° by hand, together with its fastening head, against the resistance afforded by a spring until it comes to rest. This result is obtained by knife-head spindles whose turning motion is optional and which are rotated upon the upward and downward movement of the spindle rail.

The invention is hereafter described in connection with an example of an embodiment of the same, as shown in the accompanying drawings, wherein.

Figure 1:
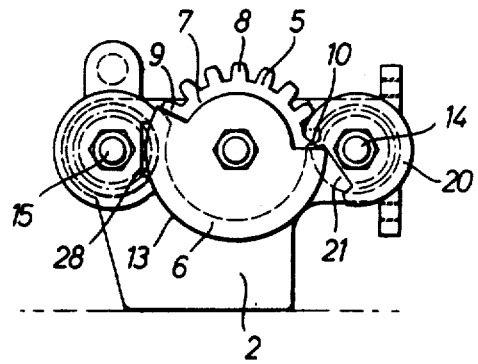
FIG. 1 shows the device as seen from the outside of the machine.
Figure 2:
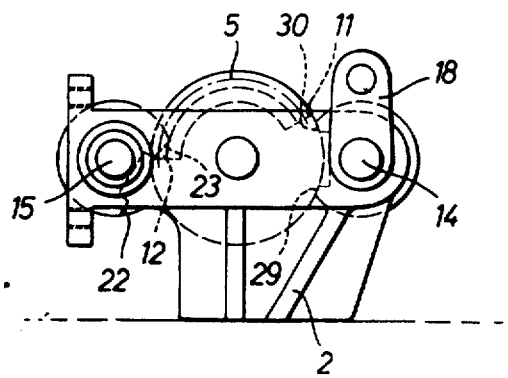
FIG. 2 shows the device as seen from the inside of the machine.
Figure 3:
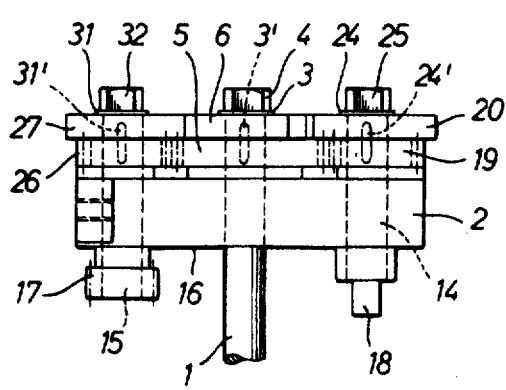
FIG. 3 shows a top view of the device.
Figure 4:
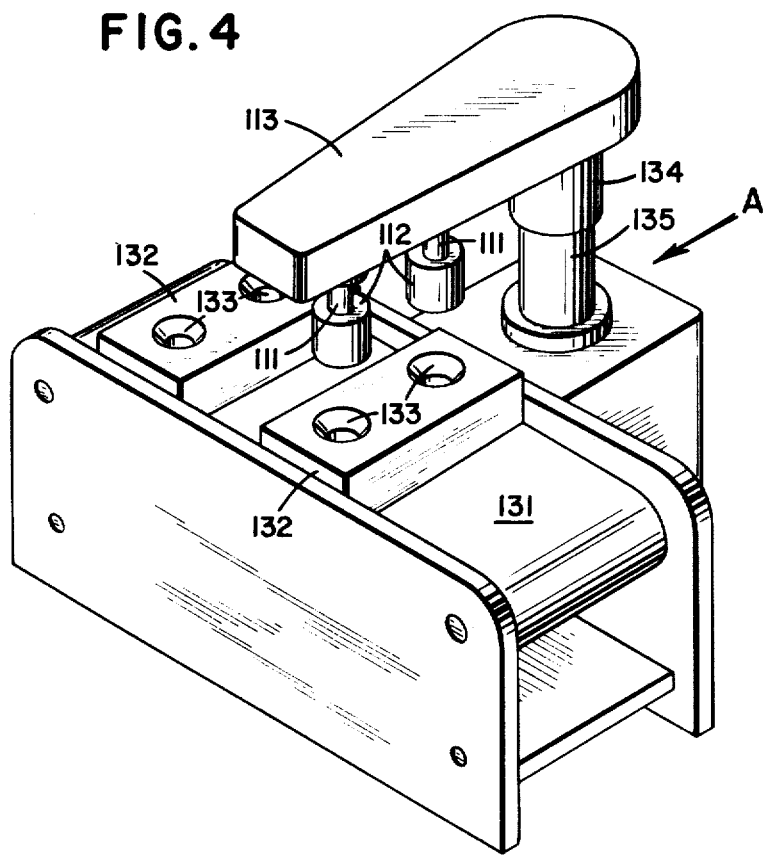
FIG. 4 shows a perspective elevation of a conventional dough indentation machine which may include the invention.

The main drive shaft 1 is mounted horizontally on a pedestal 2 and driven by conventional drive means (not shown). By its rotating motion this shaft drives the intermittent working cycle of the cutter head jack frame of a notching machine for kneaded dough and also the conveyor belt for the cup holders. The intermediate member is mounted directly on the main drive shaft 1 and is securely fastened by a washer 3, a key 3' and a nut 4 screwed on to the threaded end of the drive shaft 1. The intermediate member consists of a gear segment disk 5 and a blocking disk 6, the latter having a cutaway segment. The gear segment disk 5 and the blocking disk 6 are rotated synchronously by the drive shaft 1. The gear segment disk 5 has eleven teeth, all having the reference numeral 8. The cutaway segment 7 starts at the center plane 9 of the first and ends at the center plane 10 of the last tooth. There are also two limit stops 11 and 12 on the cutaway segment 7. In the design of the intermediate member, the cutaway segment of the blocking disk always corresponds to the number of teeth of the gear segment disk. The diameter of the outer circular surface 13 of the blocking disk is somewhat larger than the diameter of the gear segment disk when measured from the tip of one tooth to the tip of the real or imaginary opposite tooth.

Arranged on the left and the right of the intermediate member (5, 6, and 7) on the same pedestal 2 are the drive shafts 14 and 15 for the translatory motion of the conveyor belt for the cup holders and also for the up and down motion of the jack frame. On the side 16 of the pedestal 2, which faces the inside of the machine, the shaft 15 for driving the conveyor belt carries the gear 17. The shaft 14 driving the cutter head jack frame is equipped with a crank 18 on the inside 16 of the pedestal 2. The usual components of a roll-molding machine are connected to these components of the control device covered by the invention.

On the opposite side of the pedestal 2, the gear segment disk 5 and, directly connected to it, the blocking disk 6 with the cutaway segment 7 are mounted on the main drive shaft 1. On the same side of the pedestal 2 the drive shaft 15 for the translatory motion of the conveyor belt for the cup holders is equipped with a gear 26 which is engaged with the gear segment disk 5 of the main drive shaft 1 during one part of a drive shaft revolution while it is at standstill during the other part of the revolution. Mounted on the shaft 15 immediately next to the gear 26 is another blocking disk 27 which likewise has a cutaway segment 21 and which is cooperating with the blocking disk 6 of the main drive shaft in a manner that shall be described later on. On the cutaway segment 21 of the blocking disk 27, which is mounted on the drive shaft 15 for the intermittent working cycle of the conveyor belt, there are lateral blocking surfaces 22 and 23 shaped to fit the circumferential surface 13 of the blocking disk 6 which is mounted on the main drive shaft 1. The gear 26 and the blocking disk 27 rotate synchronously on the drive shaft 15. They are securely fastened by means of a washer 31, a key 31' and a nut 32 screwed on the threaded end of the drive shaft 15.

The drive shaft for the up and down motion of the jack frame is, on this side of the pedestal 2, equipped exactly as the just described drive shaft 15. To begin with, it carries a gear 19 which can mesh with the gear segment disk 5. While the gear 26 of the drive shaft 15 is in mesh with the gear segment disk 5, gear 19 is facing the toothless part of the gear segment disk 5 so that it cannot be driven.

Another blocking disk 20, also with a cutaway segment 28, is mounted on the drive shaft 14 next to the gear 19 for synchronous rotation. The cutaway segments 28 and 21 of the blocking disks 27 and 20 are on the same pitch circle segment. The cutaway segment 28 of the blocking disk 20 is also made with blocking surfaces 29 and 30. Finally, the gear 19 and the blocking disk 20 on the drive shaft 14 are also securely fastened by means of a washer 24, a key 24' and a nut 25 screwed on the threaded end of the drive shaft 14.

The device operates as follows. As a starting point, the main drive shaft 1 may be assumed to be in a position in which tooth 8 at one end of the gear segment disk 5 is located between two teeth of the gear 26 on drive shaft 15, while the tooth at the other end is located between two teeth of the gear 19 on drive shaft 14 so that it will depend on the direction of rotation of the main drive shaft as to which one of the two gears will be driven. If the drive shaft 1 is rotated clockwise from this position, the teeth of the gear segment disk 5 are in mesh with the gear 19 of the drive shaft 14 so that the latter will rotate. At the same time, the cutaway segments 28 of the blocking disk 27, and 7 of the blocking disk 6, respectively, are preventing an engagement of these two blocking disks. But as it has been determined by the direction of rotation which the drive shaft 1 has taken from the initial position that the gear 19 is first to be meshed with the gear segment disk 5, this rotation of the main drive shaft 1 causes the circumferential surface 13 of the blocking disk 6 to reach the second blocking surface 23 of the blocking disk 27 so that the blocking disks 27 and 6 will be engaged. From this instant the drive shaft 15 for the translatory motion of the conveyor belt for the cup holders is blocked. Any intentional or unintentional dislocation of the conveyor belt from its exact position in the working cycle is therefore impossible.

After one revolution of the gear 19 on the drive shaft 14 the last tooth 8 of the gear segment disk has left the gear 19 on the drive shaft 14 and at the same time the circumferential surface 13 of the blocking disk 6 has reached the second blocking surface 30 of the blocking disk 20 so that now the blocking disks 6 and 20 are engaged. It is thereby impossible to move the drive shaft 14 for the up and down motion of the jack frame even unintentionally by leaning on the jack frame. The gear segment disk 5 is now in mesh with the gear 26 of the drive shaft 15 for the translatory motion of the conveyor belt for the cup holders and by revolving the blocking disk 20 of this drive shaft 14 becomes disengaged from the circumferential surface 13 of the blocking disk 6 and rotates within the cutaway segment 7 of the blocking disk 6. After one revolution of the gear 19 the last tooth 8 of the gear segment disk 6 leaves the gear 26 and at the same time the circumferential surface 13 of the blocking disk 7 reaches the second blocking surface 23 of the blocking disk 27 on the drive shaft 15 so that the further driving of this shaft is blocked. After this the working cycle will repeat itself as described.

With reference to FIGS. 4—7, a conventional dough working machine which includes the invention will now be described. The spindles 111 bear at their lower end a fastening head 112 in which the neck of the knife head (not shown) can be held. The spindles 111 are supported in the knife-head spindle rail 113 so as to be turnable about their axis but not displaceable in the longitudinal direction, and each of them bears at its upper end a gear 114 with which a rack 115 engages.

The rack 115 is displaceable (towards the right in FIGS. 5 and 6) and can be fixed in position against the pull of its return spring 16.

Figure 5:
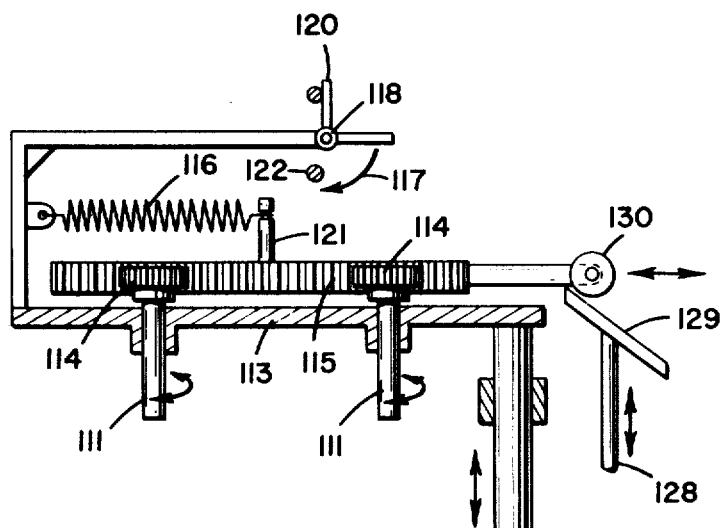
FIG. 5 is a basic diagram of the spindle rail movement showing one form of rack stop for the machine of FIG. 4.
Figure 6:
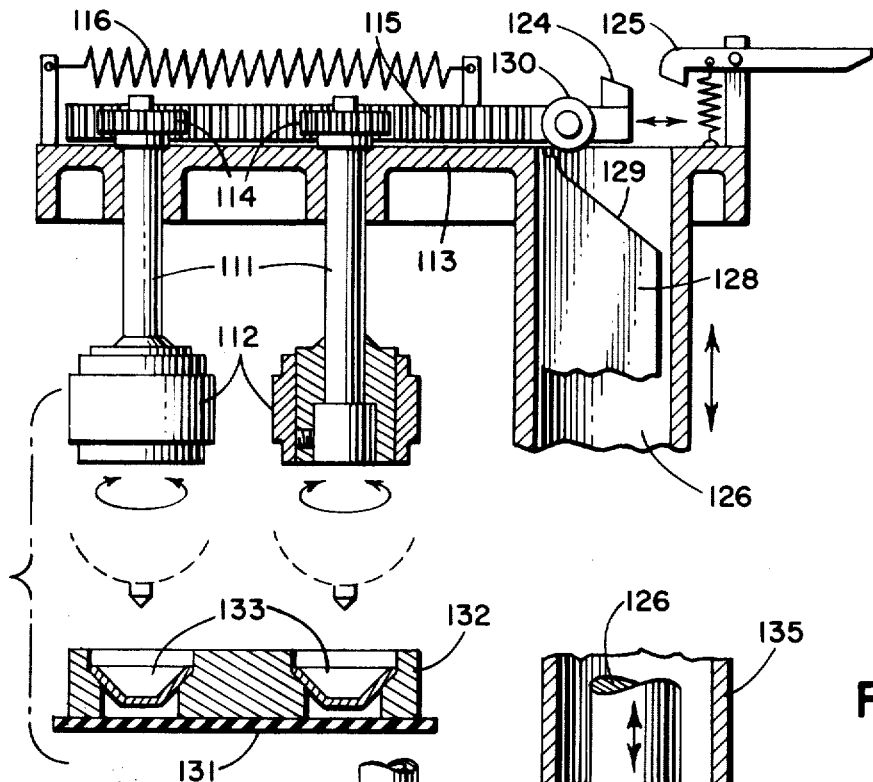
FIG. 6 shows schematically an elevation (partially in section) of one embodiment of the machine including another form of rack stop.

In FIGS. 5 and 6 there are shown two types of possible fastenings for the rack and thus interrupting the rotation of the spindles.

FIG. 5 shows an angle arm 120 which is normally turnable around its axis 118, for instance, by means of a knob (not shown) and which has a support which is rigidly connected with the knife-head spindle rail 113. The angle arm 120 is shown in the position in which it permits the passage of the spring support 121 which is firmly attached to the rack 115 upon the shifting of the rack 115. If angle arm 120 is turned by 90°, in the direction indicated by the arrow 117 at the moment when the rack 115 is shifted (towards the right in FIG. 5) so that it rests against the stop 122, then the spring support 121 and thus the rack 115 will be held by the angle arm 120 in the displaced position.

Another type of possible fastening is shown in FIG. 6. On the end of the rack 115 there is seated a stay bolt 124 which, upon corresponding strong displacement of the rack 115 in the direction towards the right (FIG. 6) can engage in a pawl 125 against the pull of the spring 116.

The vertical upward and downward movements of the spindles 111 and thus of the knife heads are effected by a rod 126 firmly connected with the knife-head spindle rail 113 and arranged outside the sphere of action of the knife heads, said rod being moved up and down in the direction indicated by the double arrow 127 by the driving force (not shown) in the required or desired rhythm. A curved template 128 has the curve 129 thereof which defines the template on the top arranged immovable with respect to this upward and downward movement. Along the curve 129, there slides, in the course of the downward movement of the rod 126 and thus of the knife-head spindle rail 113, the roller 130 arranged on the rack 115, as a result of which the rack 115 is displaced (towards the right in FIGS. 5 and 6). In this way, the spindles and thus the knife head are turned, whereby, in combination with the downward movement, a helical movement of the knife head is assured.

Upon the upward movement of the rod 126, a return movement of the helical rotation of the knife heads takes place in such a manner that the return spring 116 exerts a pull on the roller 130 and forces it to come against the curve of the curved template 128.

In the schematic outside elevation of an example of the invention (FIG. 4), the upward and downward moving knife-head spindle rail 113 (FIG. 6), the spindles 111 and the fastening heads 112 of the spindles can be seen. The knife heads (not shown) engage in the latter. The conveyor belt 131 bears the cup containers 132 in which the cups 133 are contained. The knife-head spindle rail 113 has the hollow cylinder 134 firmly connected with it. Cylinder 134 is open at the bottom and slides over another hollow cylinder 135. Rod 126 is located within cylinder 135.

Figure 7:
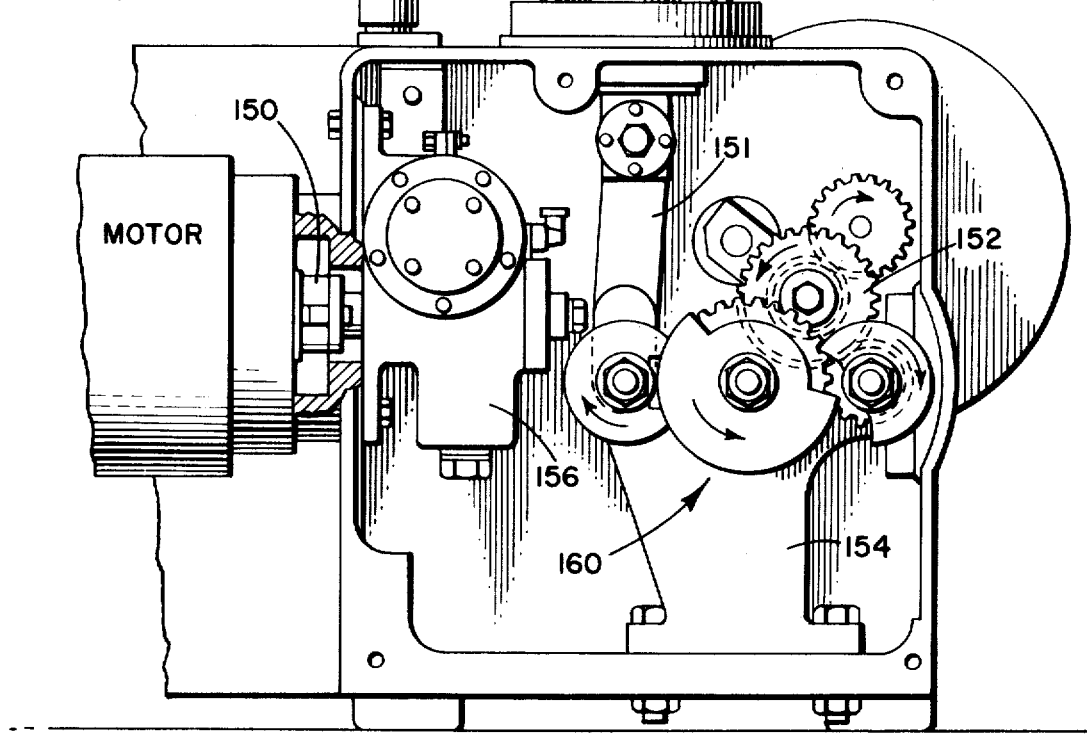
FIG. 7 is an elevation of the intermittent drive housing with cover removed and viewed along line A of FIG. 4.

With reference to FIG. 7, the properly timed upward and downward movement of rod 126 and conveyor belt 131 results from the intermittent drive mechanism (as described hereinabove) generally indicated as 160 and supported by bearing pedestal 154. As seen in the figure, the left-hand part drives the puncher head via connection 151 and rod 126 as previously described. The right-hand part drives the shell belt 131 in timed relation with the movement of spindles 111.

Power is conventionally provided through motor coupling 150, worm drive 156, and intermittent pinion 152.

Of course, variations of the specific construction and arrangement of this type device herein disclosed can be made by those skilled in the art without departing from the invention as defined in the appended claims.

I claim:

1. An indenting machine for successively working pieces of dough comprising a stationary frame, a conveyor belt held by the frame for carrying a plurality of pieces of dough spaced longitudinally one another by a predetermined distance, a knife-head spindle rail extending over said conveyor and capable of carrying a knife for penetrating the dough to work the same, drive means coupled to periodically advance and stop the belt to bring successive pieces of dough to a work zone and remove the same from that zone after a predetermined period of time and further coupled to lower and raise said knife-head spindle rail such that a knife carried thereby successively penetrates and withdraws from the pieces of dough when in the work zone, said machine further including means coupled to the knife-head spindle rail for normally rotating the knife during upward and downward movement of said knife-head spindle rail and being selectively adjustable to two positions, one of which effects rotation and the other of which prevents rotation of the knife, wherein said drive means includes a main drive motor, a main drive shaft leading directly from said motor and being continuously rotated, a pedestal mounted to the frame, said main drive shaft being journaled in said pedestal, a gear segment fixed directly on said main drive shaft, a first blocking disk fixed directly on said main drive shaft having a cutaway segment starting at the center plane of the first tooth of said gear segment and extending to the center plane of the last tooth of said gear segment, a first driven shaft journaled in said pedestal on one side of said main drive shaft, a first gear fixed on said first driven shaft to mesh with said gear segment during approximately one-half of its rotation, a second blocking disk fixed on said first driven shaft, a second driven shaft journaled in said pedestal on the other side of said main drive shaft, a second gear fixed on said second driven shaft to mesh with said gear segment during approximately the other half of its rotation, a third blocking disk fixed on said second driven shaft, each of said second and third blocking disks defining a cutaway segment terminating at opposite ends in lateral arcuate blocking surfaces that have a curvature corresponding with the periphery of said first blocking disk, the orientation of said second and third blocking disks being that alternately the blocking surfaces of one and then the other engages the periphery of the first blocking disk, while the other and then the one is free to rotate due to interfitting of the cutaway segments, said first driven shaft coupled to drive said belt and said second driven shaft coupled to raise and lower said knife-head spindle rail.

2. An indenting machine according to claim 1, wherein said blocking disks define radial surfaces serving as limit stops to preclude overstressing the teeth of the gear segment and gears on account of the intermittent actuation.

3. An indenting machine as set forth in claim 1, wherein said last mentioned means comprises a knife-head spindle having a geared part, a geared rack meshed with said geared part such that translation of said rack effects rotation of the knife-head spindle, a roller connected to the rack, a member coupled stationary with the frame defining an inclined surface positioned to engage said roller when said knife-head spindle rail is lowering and rising to displace the roller from a vertical path and effect translation of said rack.

4. An indenting machine as set forth in claim 3, wherein a spring is connected to the knife-head spindle rail to bias the rack in a direction opposite the direction of movement of the rack when the knife-head spindle rail is lowering, and latch means carried by said knife-head spindle rail for selectively locking the rack against action of the spring in a position in which the roller remains free of said inclined surface during upward and downward movement of said knife-head spindle rail to prevent knife-head rotation during the cycle.